United States Patent [19]
Johnston

[11] Patent Number: 5,437,112
[45] Date of Patent: Aug. 1, 1995

[54] SPORTS SHOE FOR ACTIVITIES WHICH INVOLVE KICKING A BALL

[75] Inventor: Craig Johnston, Dublin, Ireland

[73] Assignee: Zermatt Holdings Ltd., London, Great Britain

[21] Appl. No.: 969,196

[22] PCT Filed: Dec. 2, 1991

[86] PCT No.: PCT/GB91/02134

§ 371 Date: Feb. 16, 1993

§ 102(e) Date: Feb. 16, 1993

[87] PCT Pub. No.: WO92/22224

PCT Pub. Date: Dec. 23, 1992

[30] Foreign Application Priority Data

Jun. 19, 1991 [GB] United Kingdom ............... 9113272

[51] Int. Cl.⁶ .......................... A43B 5/02; A43B 5/00
[52] U.S. Cl. .......................................... 36/128; 36/133
[58] Field of Search ................................ 36/133, 128

[56] References Cited

U.S. PATENT DOCUMENTS

| | | | |
|---|---|---|---|
| 3,525,165 | 8/1970 | Randall, Jr. | 36/133 |
| 3,650,051 | 3/1972 | Sass | 36/133 |
| 4,442,615 | 4/1984 | Danks | 36/133 |
| 4,447,971 | 5/1984 | Bente | 36/133 |
| 4,882,858 | 11/1989 | Signori | 36/133 X |

FOREIGN PATENT DOCUMENTS

| | | | |
|---|---|---|---|
| 2293884 | 8/1976 | France | 36/133 |
| 1805045 | 1/1960 | Germany . | |
| 2743666 | 3/1978 | Germany | 36/133 |
| 2652055 | 5/1978 | Germany | 36/133 |
| 2827172 | 1/1980 | Germany | 36/133 |
| 3314274 | 10/1983 | Germany | 36/128 |
| 3831599 | 3/1990 | Germany | 36/128 |
| 0039362 | 9/1985 | Japan | 36/133 |
| 2018570 | 10/1979 | United Kingdom . | |
| 2230174 | 10/1990 | United Kingdom . | |

Primary Examiner—Paul T. Sewell
Assistant Examiner—BethAnne Cicconi
Attorney, Agent, or Firm—Hoffmann & Baron

[57] ABSTRACT

A football boot (10) comprises an upper (12) formed with a ball contact surface (24) which is resilient. The ball contact surface may be generally flat and/or concave and provided with a plurality of formations formed of an elastomeric material, wherein the ball contact surface (24) and/or the formations are deformable upon contact with a ball. The boot allows a player to have greater ball control and execute more powerful and accurate kicks than with a conventional boot.

17 Claims, 7 Drawing Sheets

SPORTS SHOE FOR ACTIVITIES WHICH INVOLVE KICKING A BALL

This invention relates to a football boot and also to a kit for modifying a conventional football boot. The term 'football boot' as used herein means a boot which is used not only as a boot for playing football but for any sport which involves a player kicking a ball.

With a conventional football boot, in common with most other kinds of footwear, the front upper portion of the boot which covers the bridge and toes of a wearer's foot is convex-shaped to conform to the shape of the foot. In order for a player to effect a more controlled kick, shot, or hard pass, the ball ideally must be in contact with one of a number of 'a sweet spots', the main one being a central area on the upper portion of the boot. With conventional football boots, it is difficult precisely to locate the optimum part of the ball surface on this area, and success therefore depends to some extent on chance or ability.

Also, heretofore football boots have been provided with leather, plastic or like material surfaces on which a ball tends to slip, especially in wet conditions, thereby reducing a player's ability to control the ball.

By using this invention these disadvantages are somewhat lessened by the provision of a football boot having an upper formed with a ball contact surface which is resilient at least in part. The resilient part of the ball contact surface may be in the form of a pad which may be formed of cellular material including gas or air filled voids. Preferably the ball contact surface is generally flat and/or concave in shape and is provided with a plurality of formations formed of an elastomeric material, wherein the ball contact surface and/or formations are deformable upon contact with a ball. In addition to or instead of being generally flat and/or concave, the ball contact surface may be relatively thin in comparison with a relatively thicker boundary region.

The invention also provides a kit for modifying a conventional football boot which comprises a moulding having a ball contact surface which is resilient, and means for securing the moulding to the upper of a football boot. Preferably, the ball contact surface is formed of a non-slip material such as rubber and has formations which are arranged to grip and cushion a ball which comes into contact with the surface. The formations may take the shape of parallel extending ribs or nipples having malleable upper edges that can deform to grip the ball, or, alternatively, projections with sharp edges that can bite into the ball. The ball contact surface may be tacky in nature instead of, or in addition to, being provided with formations.

The ball contact surface may be partly concave and partly flat but in general is shaped to allow as much surface contact as possible with the surface of the ball at any one time. An upwardly facing ball contact surface and a sidewardly facing ball contact surface may be provided at the top and sides of the boot upper, respectively. The flat or concave sidewardly facing ball contact surface or surfaces are curved to conform to the outline of the wearer's foot.

In particular, the upwardly facing ball contact surface may be generally parallel to the sole beneath, while at the sides and at the toe the upper may be generally perpendicular to the sole, forming a wall which terminates in a distinct and comparatively less yielding upper edge bounding the upwardly facing contact surface.

Preferably, the upper edge is a raised lip on the front and on one or both sides. The sidewardly facing ball contact surface is bounded by such an upper lip, and a lower lip may be provided at the bottom of the boot where the side joins the sole. The material of the boot in the region of the lip or lips may be thicker than the material elsewhere. Alternatively, the height of the ribs or projections may be greater in the region of the lip or lips than elsewhere.

The raised lips may be formed integrally with the respective front and side portions of the boot and it is preferred that the whole football boot be injection moulded from a single material. In the case of the kit, the moulding may be secured to the upper of the boot by means of adhesive or stitching and the kit may also include instructions for applying the moulding to the boot. In general, the moulding would be applied to sweet spot areas at the top and sides of a conventional football boot.

Some advantages of the preferred boot are as follows:
1. By having more boot surface in contact with the ball in comparison to a conventional boot, the user has a greater ability to control or work the ball, that is, to bend the ball, impart hook-spin, slice-spin, top-spin, back-spin, and generally make the ball move technically in the air. The greater the opportunity for movement, the greater is the opportunity for accuracy.
2. The gloving effect of a greater contact area serves to take the pace off the ball when receiving a pass.
3. This gloving or cushioning effect stabilises the movement of the ball momentarily before assisting in its redirection.
4. If the point of contact has been inaccurate, the concave surface tends to direct the centre of the ball back to the crucial central catchment area, that is, the sweet-spot.
5. Unlike leather, the material of the ball contact surface has an inherent energy creating greater power when the ball is kicked, or less effort from the kicker. Again, this feature allows for greater accuracy.

In general at least 80% of the ball contacting surface is flat or concave and with the upwardly facing ball contact surface the longitudinal extent of the surface is generally proportional to the transverse extent.

Synthetic or natural elastomeric material, such as styrene-butadiene, polyurethane, or rubber, may be used for the ball contacting surface and its various properties and thickness are chosen in accordance with the function of the boot. Thus, for power kicking the rubber material is of sufficient thickness to remain stable upon impact with the ball, the inner surface next to the foot deforming comparatively little, whereas for dribbling the material is thinner and more flexible so that the wearer can feel the ball.

In a preferred embodiment, at least part of the football boot upper is formed of an inner layer of soft leather and an outer layer of an elastomeric material. The leather layer provides comfort to the wearer while the elastomeric layer provides the advantages outlined above. The whole of the outer of the boot may be of elastomeric material but it is preferred that a lighter weight material be used for those areas of the boot which are not intended to contact the ball such as the parts of the boot covering the heel and bridge of the foot. Examples of suitable light weight materials which may be used for the non-ball contacting areas of the boot include fabrics and plastics.

The invention also provides method of manufacturing a football boot which comprises moulding an elastomeric material to form a ball contact surface provided with a plurality of formations. Preferably, the elastomeric material is moulded onto a lining which may be formed of leather.

Although the shape and thickness of the layer forming the ball contacting area of the boot will depend upon whether the boot is to be used for power kicking or dribbling, it is also possible to convert a boot adapted for one function into a boot adapted for a different function by applying detachable elastomeric material mouldings to the boot. Thus, a kicking boot may be formed by securing elastomeric mouldings of appropriate thickness and shape at least to the 'sweet spots' of a dribbling boot.

Clearly the invention may be carried out in a great variety of ways but one particular embodiment thereof will now be described by way of example, with reference to the accompanying drawings in which.

Figure 1:
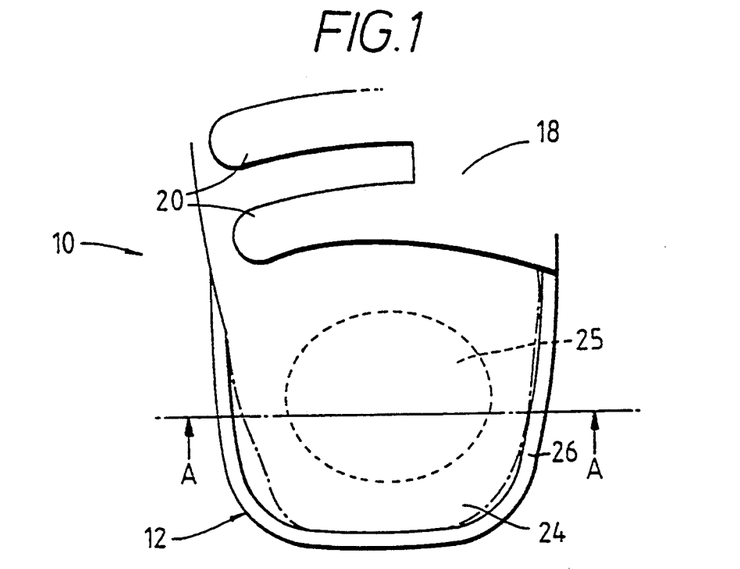
FIG. 1 is a top view of the front portion of a football boot in accordance with the invention.
Figure 2:
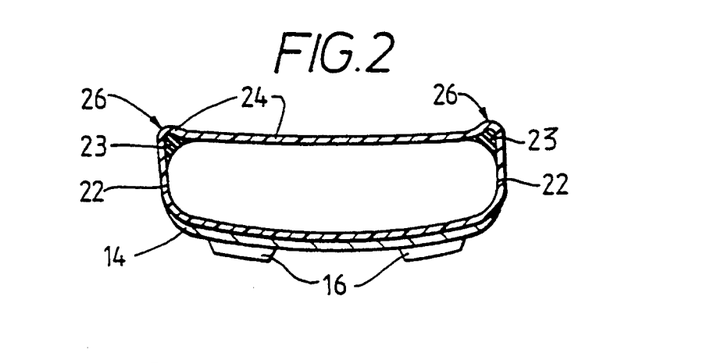
FIG. 2 is a diagrammatic cross-sectional front view taken along the line A—A in FIG. 1.
Figure 3:
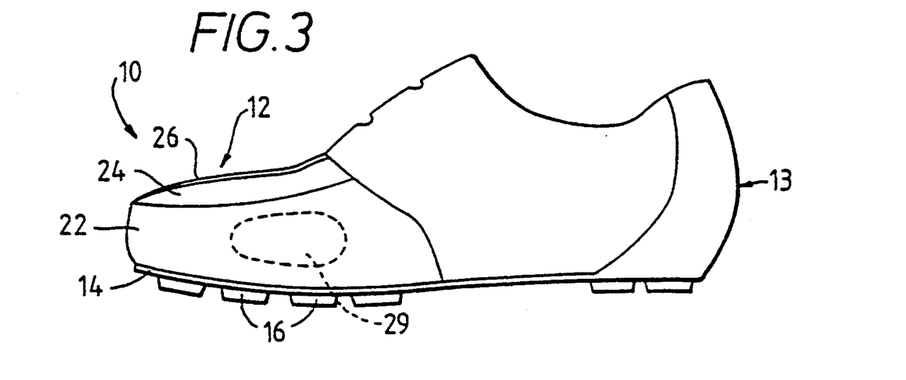
FIG. 3 is an inner side view of the football boot of FIG. 1.

Referring to FIGS. 1 to 3, a boot 10, the front portion of which is illustrated in FIG. 1, is injection moulded from an elastomeric material comprising styrene and butadiene and comprises a front upper portion 12, a heel portion 13, a sole 14 provided with studs 16, and a fastening portion 18 for retaining the boot on the foot of the wearer. The fastening portion 18 consists of two tongues 20 lined with a hook and loop fabric, such as Velcro, at their inner surface to mate with correspondingly sized strips of fabric attached to the boot surface (not shown). However, any type of fastening may be used. The upper portion 12 comprises side walls 22 and integral with the side walls 22 is an upwardly facing ball contact surface 24 of generally concave shape having a generally flattened central portion which extends over substantially the whole of the boot 10. Sweet spots 25, 29 are present on the upper surface 24 (FIG. 1) and on each of the side walls 22 (only one side shown in FIG. 3), of the boot. This contact surface 24 is generally parallel to the sole in longitudinal section and slightly concave. The flattened central portion is bounded by upper edges 26 at the front and both sides in the form of raised lips, which are supported in the embodiment of FIGS. 1 to 3, by air and rubber 23.

Figure 4:
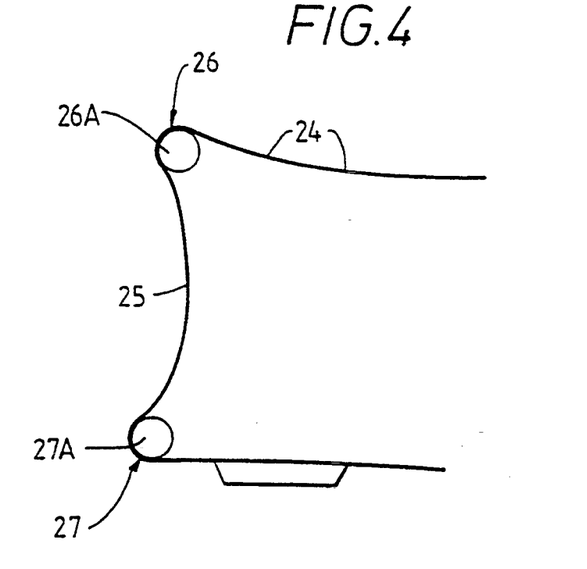
FIG. 4 is a diagrammatic transverse cross-sectional front view of a side portion of a modified football boot in accordance with the invention.
Figure 5:
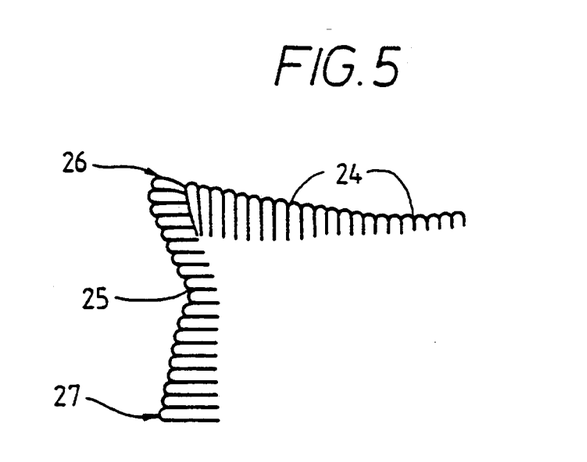
FIG. 5 is a transverse cross-sectional front view of a side portion of another modified football boot in accordance with the invention.

The embodiments of FIGS. 4 and 5 have, in addition to an upwardly facing ball contact surface 24, sidewardly facing ball contact surfaces 25 (only one side is shown) which, like the upwardly facing ball contact surface, are of generally concave shape in cross-section. The central portion of the side surface 25 is between the upper side edge 26 and the lower side edge 27, both edges being in the form of raised lips. In FIG. 4, the lips 26, 27 are supported by means of respective ribs 26A, 27A but, alternatively, the material of the boot in the region of the raised lips may be thicker than the material of the boot in the region bounded by or between the raised lips. The ball contact surfaces 24, 25, are textured by being formed with a series of resiliently deformed raised parts (not shown in FIG. 1 to 4), which tend to grip the ball. In FIG. 5 the ball contact surfaces 24, 25 are made up of plurality of parallel extending ribs having a greater height in the region of the lips 26, 27, than in the regions between the lips.

Figure 6A:
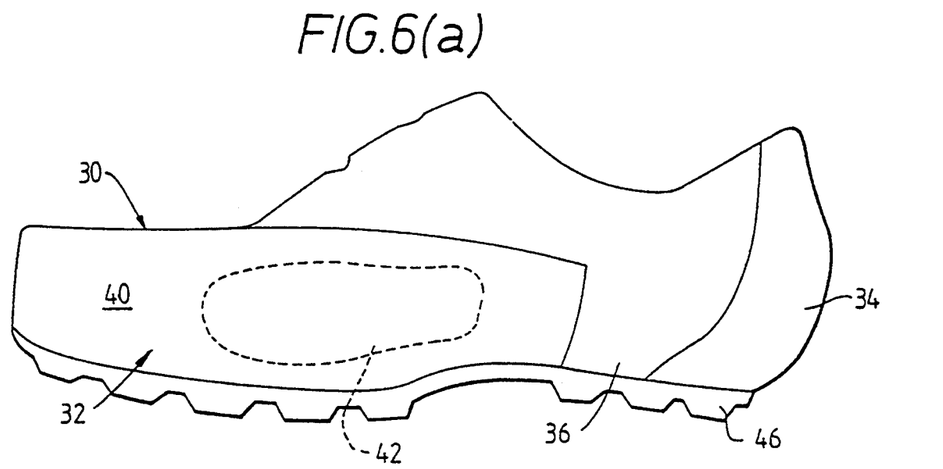
FIG. 6(a) is an inner side view of a further football boot in accordance with the invention.
Figure 6B:
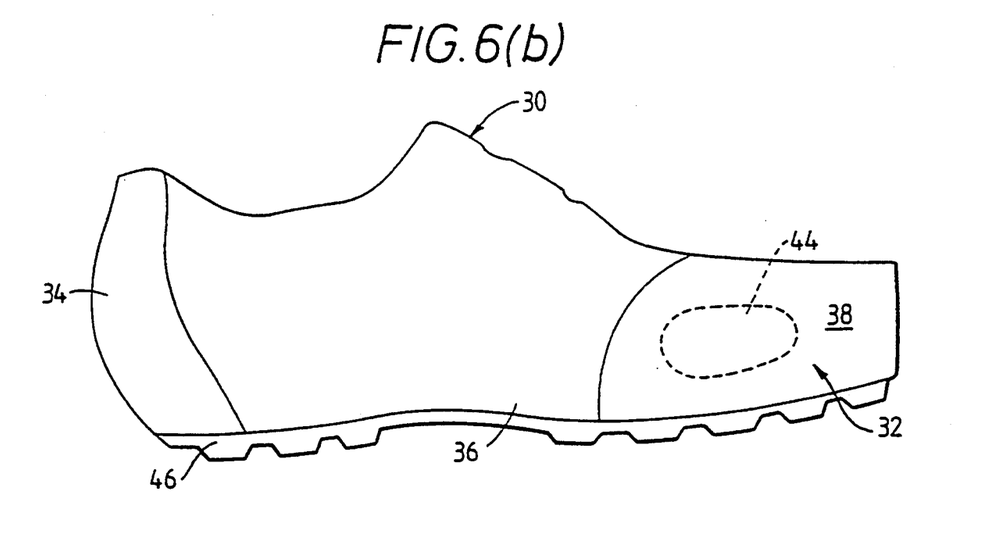
FIG. 6(b) is an outer side view of the football boot of FIG. 6(a)
Figure 7A:
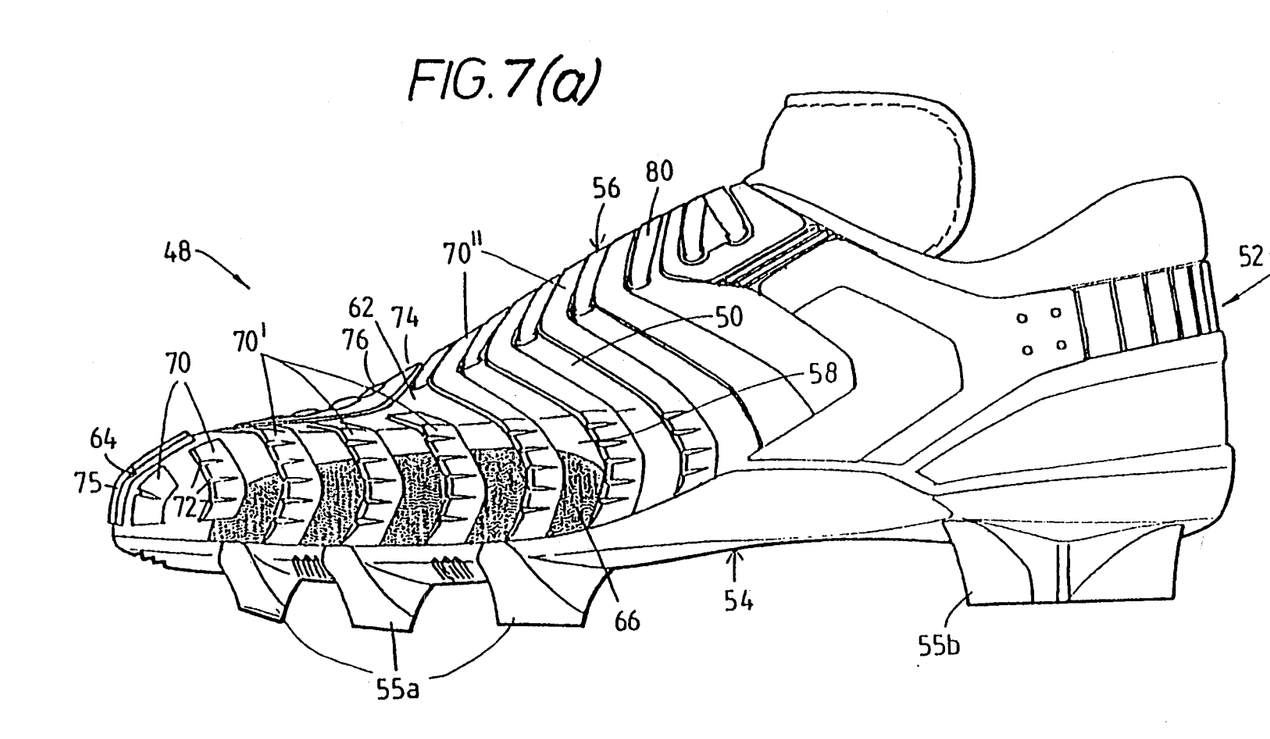
FIG. 7(a) is an inner side view of a further football boot in accordance with the invention.
Figure 7B:
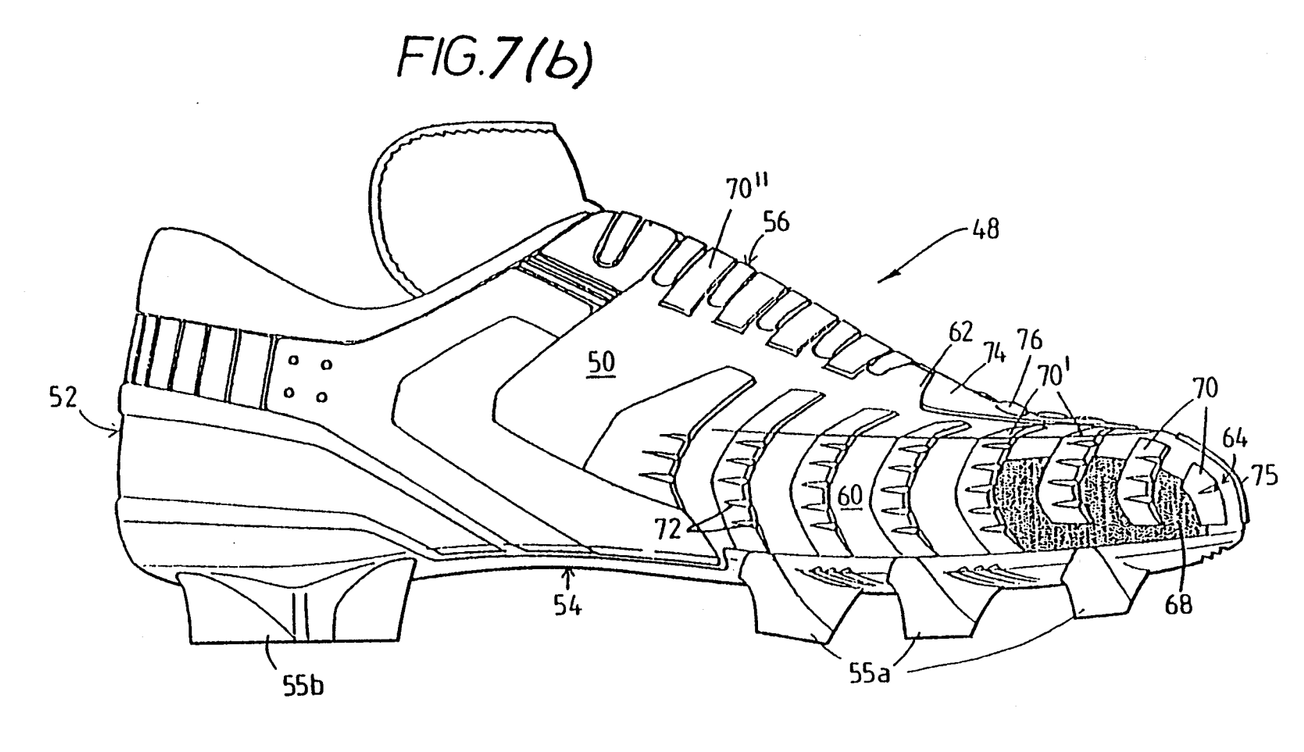
FIG. 7(b) is an outer side view of the football boot of FIG. 7(a)
Figure 7C:
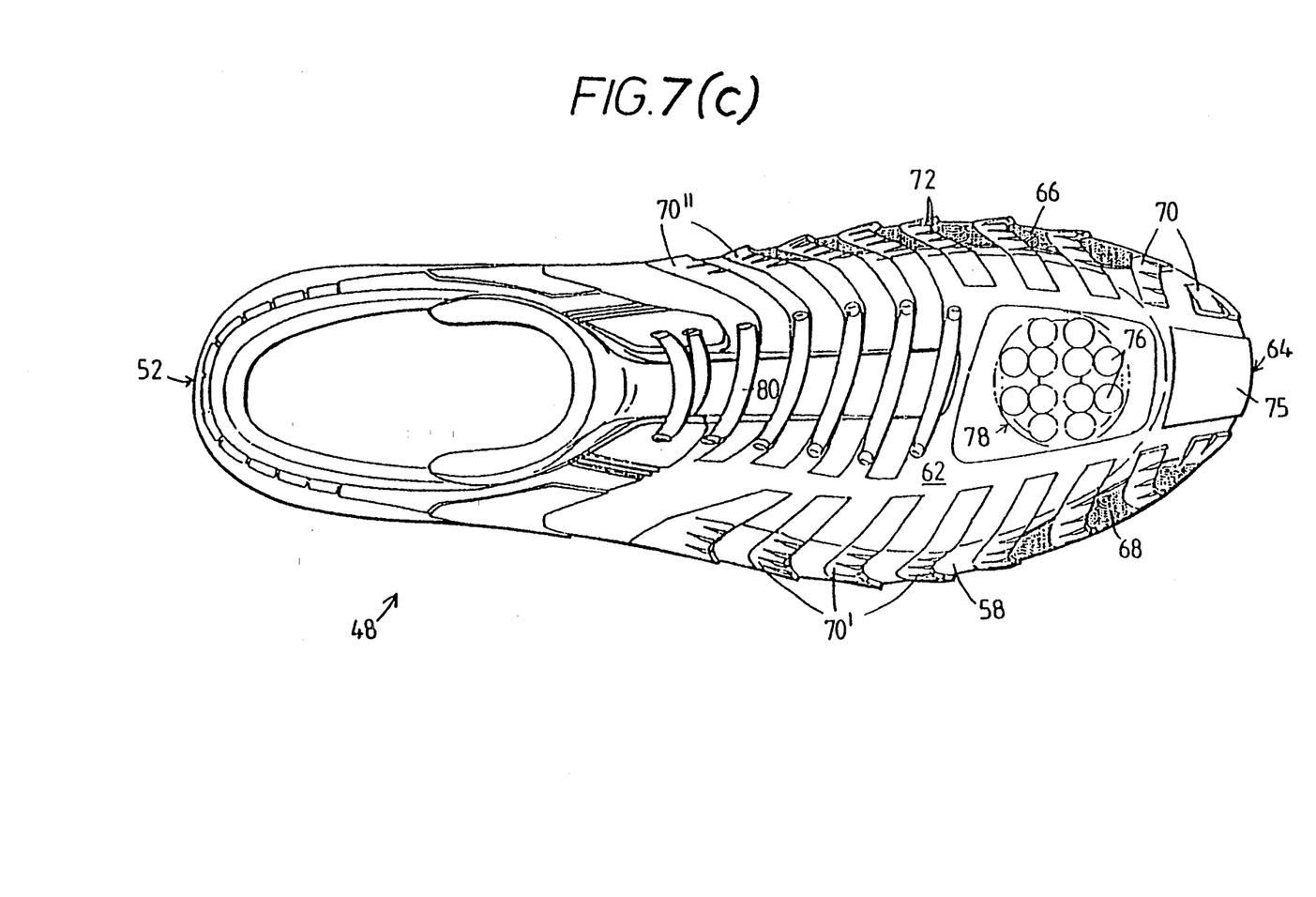
FIG. 7(c) is a top view of the football boot of FIG. 7(a)
Figure 7D:
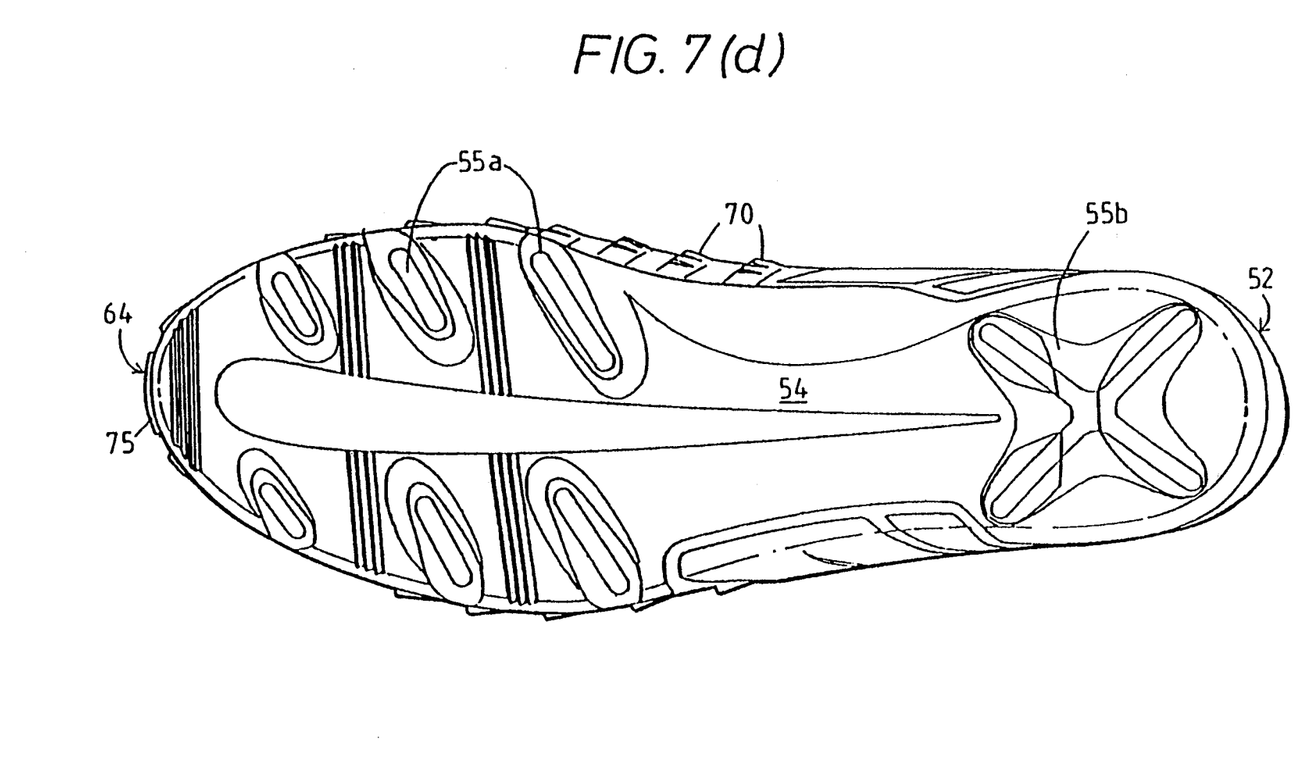
FIG. 7(d) is a bottom view of the football boot of FIG. 7(a)

Referring to FIGS. 6, the boot 30 is shown to have an upper consisting of three main outer surface sections formed on a leather inner sleeve (not shown) which are: a front section 32 formed of rubber injection moulded over the inner sleeve, rear section 34 formed of a lightweight, rigid plastics material which is preferably integral with the sole and an intermediate section 36 formed of a strong fabric to provide flexibility in the middle region of the boot. The front section 32, extending over the front of the wearer's foot, is the same approximate shape as the front upper portion 12 of the boot shown in FIGS. 1 to 3 but has outer 38 and inner 40 sides which extend rearwardly up to, respectively, just over halfway along the length of the boot (i.e. over the instep) (FIG. 6(a)) and just under halfway along the length of the boot (i.e. terminating in the region of the outer toe of the wearer) (FIG. 6(b)) so as to cover sweet spots 42 and 44, respectively. Sole 46 is formed of a lightweight, rigid, plastics material, and the rear section 34 is integral with the sole.

The front section is preferably textured as described above with reference to FIGS. 1 to 3, having formations or projections to grip the ball at least in the areas of the sweet spots.

As before, the thickness of the rubber part of the boot may vary from area to area on the boot so that, for example, in the region of the edge or lip running around the upwardly facing contact surface area, the rubber material is considerably thicker than at the sides or over the upwardly facing area. It will be understood that in the case of a boot having an inner leather sleeve, the sleeve is of a generally convex shape, whereas the flat or concave configuration of the upper and side surfaces is obtained by varying the thickness and the structure of the rubber material.

The sides of the boot between the rubber front part and the heel may be covered by fabric as mentioned above with the front edges of the fabric trapped under the edge portions of the moulded rubber part. Alternatively, the leather inner sleeve may be left exposed in these areas and simply coloured as required.

Referring to FIG. 7, a boot 48 comprises a front upper portion 50 formed of leather, a heel portion 52 and a sole portion 54 formed of polyurethane, and a conventional fastening portion 56. The sole portion 54 is provided with downwardly extending blade-like projections 55a, 55b which are described in detail in International Patent Publication No. WO91/11929, will not therefore be described further here. The front upper portion 50 comprises side walls 58, 60, a top portion 62 and a toe cap portion 64 on which are provided shaped pieces 70, 74 and 75, respectively, of elastomeric material comprising styrene and butadiene. The elastomeric pieces 70 on the side walls 58, 60 are in the form of strips or bars which are designed to extend over and around sweet spots 66, 68. The strips 70 extend transversely over the side walls 58, 60 and are spaced longitudinally from each other. Intermediate strips 70' extend over part of the top portion 62 and the strips 70" on the inner side wall 58 (FIG. 7(a)) closest to the rear end of the boot extend over the fastening portion 56. Where the strips 70 extend over the side walls 58, 60 they are formed with one or more transverse slits 72 which have the effect of dividing the strips 70 into separately deformable parts. The strips 70, as shown in FIGS. 7(c) and 7(d), may be formed to have a substantially triangular cross section. More specifically, the strips 70 include an elevated front wall or crest and a lower edge positioned rearwardly therefrom so as to merge into the upper of the shoe. The elastomeric piece 74 provided on the top portion 62 is formed with several rounded raised portions 76 (see FIG. 7(c)) which cover sweet spot 78. Although not shown in this boot, an elastomeric piece with formations may also be provided on the heel portion 52. Laces 80 in the fastening portion 56 are shown exposed but they may be hidden by, for example, a length of material to provide a smooth surface in this area.

The embodiment of FIG. 7 is particularly advantageous for effecting a lateral kick which is ordinarily executed using the inner side of the boot. In a lateral kick, the ball travels along the inner side region of the boot and its line of travel is interrupted by the elastomeric strips 70 which deform at successive locations along the line, thereby enhancing contact surface area between ball and boot. In this way, it is possible to achieve greater spin on the ball with a lateral kick as well as provide greater distance to such a kick without extra effort on the part of the wearer. Instead of being formed of leather, the areas between the strips 70 may be formed of an elastomeric material to enhance friction between boot and ball further.

By using an elastomeric material for the formations of the ball contact surfaces, energy over and above that provided by a player's return kick is imparted to the ball. When formations are present, energy is stored in the formations when they are deformed by a received ball and is imparted to the ball as the formations reform when the ball is released, thereby assisting in forcing the ball in the direction of the return kick. With certain kinds of kicks, however, the formations may not be deformed. In such cases, a certain amount of energy is still imparted to the ball due to the resilient nature of the elastomeric contact surface. Moreover, use of elastomeric material as opposed to leather or like material increases friction between the boot and ball which is unaffected by wet conditions.

The resilient pad described may comprise a plurality of sealed gas or air filled compartments. Such pads may be provided at sweet sports of the boot instead of or in addition to the elastomeric formations described herein.

By having generally flat and/or concave ball contact areas, a player is less likely to execute misplaced kicks with the result that accurate, repeatable kicks can be executed and erratic kicks can be minimized.

When the boot has sidewardly facing ball contacting surfaces as described, the boot is ideally suited for dribbling or juggling a ball and is particularly effective in enabling a player to drag a ball back towards his body using just the sides of the boot. This is because the ball appears to adhere temporarily to the ball contacting surfaces.

With any of the embodiments described, the whole boot may be made from a single material such as rubber in an injection moulding process in which case the boot is both cheaper and simpler to manufacture than conventional football boots which are manufactured from several pieces which must be cut to shape and stitched and glued together. As an alternative to moulding the whole boot, the sole may be moulded separately and may extend over the back upper portion of the boot.

An alternative method of manufacture of the boot described may comprise providing pads of elastomeric material having formations as defined above onto a lining to cover areas which are to become the sweet spots of the boot and overmolding a layer of a different elastomeric or a plastic material in such a way that the formations are exposed through the resulting outer layer.

It is possible to effect certain kicks with the boot described that would be impossible with conventional boots.

In use of conventional football boots, the natural swing of the foot and leg sends the ball away from the point of contact. The boot described, however, retains ball contact for longer and therefore allows more power and accuracy for certain types of kick.

It will be appreciated that the actual size and shape of the ball contact surface may differ from that specifically described without departing from the scope of the invention.

I claim:

1. A sports shoe for activities which involve kicking a ball, the sports shoe having an upper and a sole both having a longitudinal extension, wherein at least one preferred ball contact surface region of an outer surface of said upper is provided with a plurality of resiliently deformable strip formations spaced longitudinally apart from each other and arranged in a substantially parallel relation to each other and extending over said upper transversely with respect to said longitudinal extension, each strip formation having a free edge forming a crest of the strip formation and a lower edge extending oppositely therefrom so as to merge into the upper of the shoe thereby providing a strip formation having a substantially triangular cross-section over substantially the entire length of said strip formation and wherein at least one of the strip formations includes a plurality of slits therein which extend substantially in parallel to said longitudinal extension and which divide said crest of each strip formation into separately deformable strip formation portions, thereby providing an improved gripping surface when contacting a ball.

2. A sports shoe according to claim 1, characterized in that the strip formations are in the form of a plurality of bars.

3. A sports shoe according to claim 1, characterized in that the cross section of each strip formation has an asymmetric triangular configuration such that a base of the triangle is connected with the upper and a free edge is displaced, with respect to said base, toward a tip of the shoe.

4. A sports shoe according to claim 1, characterized in that the upper includes lacing and in that strip formations provided on lateral regions of the shoe upper extend between adjacent sections of the lacing.

5. A sports shoe according to claim 1, characterized in that at least one of said ball contact surface regions is provided with a resilient pad and said strip formations are formed on the pad.

6. A sports shoe according to claim 5, characterized in that the resilient pad is a cellular material including voids filled with one of gas and air.

7. A sports shoe according to claim 1, characterized in that at least one of said ball contact surface regions is generally flat.

8. A sports shoe according to claim 1, characterized in that at least one of said ball contact surface regions is generally concave.

9. A sports shoe according to claim 1, characterized in that at least one of said ball contact surface regions is partly flat and partly concave.

10. A sports shoe according to claim 1, characterized in that an upwardly facing ball contact surface region provided at a top surface of the shoe upper is generally parallel to the sole of the shoe.

11. A sports shoe according to claim 1, characterized in that a sidewardly facing ball contact surface region provided at a side of the shoe upper is generally perpendicular to the sole of the shoe.

12. A sports shoe according to claim 1, characterized in that the material of the resiliently deformable formations comprises at least one of styrenebutadiene, polyurethanes and rubbers.

13. A sports shoe according to claim 12, characterized in that the material of the resiliently deformable formations is moulded onto a lining.

14. A sports shoe according to claim 13, characterized in that the lining is one of leather and a like porous material and forms said upper of the shoe.

15. A sports shoe according to claim 1, characterized in that the material forming the resiliently deformable strip formations comprises styrene and butadiene.

16. A sports shoe according to claim 1, characterized in that the crest of the strip formations are a substantially constant thickness above the surface of the upper.

17. A sports shoe as defined in claim 1, wherein the strip formations comprise a moulding, the moulding including means for securing said moulding to the upper of the sports shoe.

* * * * *